(12) United States Patent
Rote et al.

(10) Patent No.: US 7,167,334 B2
(45) Date of Patent: Jan. 23, 2007

(54) DIGITAL ACTUATOR CONTROL AND METHOD

(75) Inventors: John Kevin Rote, Addison, TX (US); Liyong Chen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/663,266

(22) Filed: Sep. 16, 2003

(65) Prior Publication Data

US 2005/0057844 A1 Mar. 17, 2005

(51) Int. Cl.
*G11B 5/55* (2006.01)

(52) U.S. Cl. .................... 360/75; 360/78.04

(58) Field of Classification Search ............... 360/75, 360/78.04, 78.06, 78.12; 318/254, 439, 459, 318/601, 609, 610, 632, 636, 805, 812
See application file for complete search history.

(56) References Cited

U.S. PATENT DOCUMENTS

| | | | |
|---|---|---|---|
| 5,615,064 A * | 3/1997 | Blank et al. ............... 360/75 |
| 6,081,112 A * | 6/2000 | Carobolante et al. ......... 360/75 |
| 6,184,645 B1 * | 2/2001 | Brito et al. ................ 318/632 |
| 6,542,324 B1 * | 4/2003 | Galbiati et al. ............. 360/75 |
| 6,611,118 B2 * | 8/2003 | Abe et al. ................... 318/254 |
| 6,617,817 B2 * | 9/2003 | Hill ........................... 318/560 |
| 6,721,119 B1 * | 4/2004 | Hassan et al. .............. 360/75 |
| 6,762,901 B2 * | 7/2004 | Hill ........................ 360/78.04 |
| 6,771,480 B2 * | 8/2004 | Brito ........................... 360/75 |
| 2002/0033687 A1 | 3/2002 | Abe et al. .................... 318/254 |
| 2002/0180392 A1 | 12/2002 | Hill ............................ 318/560 |
| 2004/0036999 A1 * | 2/2004 | Soldavini et al. ............ 360/75 |
| 2004/0160698 A1 * | 8/2004 | Zayas et al. ................. 360/75 |

* cited by examiner

*Primary Examiner*—Hoa Thi Nguyen
*Assistant Examiner*—James L Habermehl
(74) *Attorney, Agent, or Firm*—W. James Brady, III; Frederick J. Telecky, Jr.

(57) ABSTRACT

Disclosed are methods and apparatus for digital control of a head-disk assembly actuator with dynamic velocity compensation. In preferred methods of the invention steps are disclosed in which, the actuator voltage in an HDA is sampled and a velocity error is determined. The voltage applied to the actuator is compensated for the velocity error. Disclosed methods of the invention also include steps for measuring the actual voltage at the actuator motor and alternatively, for calculating the actuator motor voltage using digital processing techniques. A digital voltage command is then provided for applying compensated voltage to the actuator motor. Apparatus for implementing the methods of the invention in a hard drive assembly having an actuator motor is also described. The apparatus includes a sampler for sampling an actuator motor voltage, a timer, and a digital processing engine for receiving a target actuator voltage command and the digital actuator motor voltage sample and for outputting a digital voltage command for controlling the actuator motor.

14 Claims, 3 Drawing Sheets

DIGITAL ACTUATOR CONTROL AND METHOD

TECHNICAL FIELD

The invention relates to digital electromechanical controls in hard disk assemblies. More particularly, the invention relates to methods and apparatus for implementing control of an actuator with dynamic velocity compensation in disk drive systems.

BACKGROUND OF THE INVENTION

The most common form of data storage for computers, hard disk drives in general share a similar basic head-disk assembly (HDA) structure. The actual disks, or platters, are traditionally made of a light alloy, glass or ceramic material coated with a very thin layer of magnetic medium. The magnetic layer has domains of magnetized areas oriented to store information through the use of read and write heads. Multiple platters on a disk drive are separated by disk spacers and are affixed to a rotatable spindle attached to a motor. The spindle is able to rotate all of the platters in unison. The motor is connected to a feedback loop to ensure the correct rotating speed, which may be on the order of 3,600 to 15,000 rpm.

The read and write heads are typically attached to a single actuator arm that moves the heads around the platters as needed. When the platter is spinning, the heads ride on a cushion of air. When the platter is at rest, the heads come to rest, or park, at a predetermined landing zone or parking area. This parking area may include ramps used to move the heads off of the surface of the disk. In order to avoid damage to the disks, heads, and stored data, precise control of the head actuator is critical in any head-disk assembly. Stepper motor actuators are known in the arts. Stepper motor actuators move the actuator over the platters in predefined steps. Stepper motor actuators are generally slow, blind to track position, incapable of meeting current track pitch requirements, prone to misalignment, and are sensitive to variations in temperature.

In an attempt to address these problems, voice coil actuators, or servos, have been developed to control head movement. The voice coil is moved relative to a permanent magnet based on the magnitude of current flowing though it. Voice coil actuators get feedback as to position over the platter, assuring that the proper tacks are read, are not constricted to discrete steps, and are less sensitive to temperature changes. Voice coil actuators generally have small cables or springs designed to drag, with some reliance on windage, the heads into a park position when the drive is powered down. This approach is not desirable however, because it requires additional current to keep the heads on track over the middle of the disk. Additional problems arise in the control of the actuators. Frequent recalibration is necessary for servo motors to maintain precision. While tracking, position feedback from the disk surface is required. Distances between the parts of a disk drive, for example the heads and the platters, are extremely small. Therefore abrupt or imprecise movements of the actuator when parking or unparking can result in damage to the heads, data, or disks.

Problems with imprecisely controlled movements in particular can arise due to the variability in the relative velocity and position of the actuator and platter. Prior art actuator control has entailed providing a fixed current to the actuator motor. This approach has the disadvantage of causing the actuator motor to continuously accelerate for as long as the actuator motor current remains uninterrupted. Excessive acceleration of the actuator motor can cause damagingly abrupt actuator movements as in slamming into a fixed "crash stop" at an excessive velocity. An alternative prior art approach has been to provide a constant voltage across the actuator motor. This approach has the disadvantage of being unresponsive to changes in the load on the actuator motor. Load changes may occur during normal operation for a number of reasons, for example, when the heads are moved up a parking ramp, the load on the motor tends to increase. The increased load may cause the head to move more slowly, causing an overall loss of speed in the operation of the actuator arm. Efforts to avoid abrupt movements have traditionally relied on sampling the motor voltage using an analog circuit, and attempting to adjust the voltage applied to the actuator motor accordingly. The lack of flexibility and area requirements of the analog circuitry hamper the effectiveness of such efforts.

Due to these and other problems with controlling the movement of actuators in HDAs, it would be useful and desirable in the arts to increase the speed and accuracy of monitoring for improved control. It would be particularly advantageous if improvements to actuator voltage control retract functions also contributed gains in terms of minimization of chip area and reductions in cost.

SUMMARY OF THE INVENTION

In carrying out the principles of the present invention, in accordance with preferred embodiments thereof, methods for use in controlling an actuator in a hard drive assembly are disclosed. Exemplary embodiments of the methods include steps of sampling the actuator voltage and processing an actuator voltage sample. From the results of the processing step, a digital voltage command is generated for controlling the application of voltage across the actuator.

According to preferred embodiments of the invention, the sampling includes steps for the conversion of an analog actuator voltage to a representation in the digital domain for digital processing.

According to further aspects of the invention, methods are disclosed in which the actuator is placed in a high impedance state for the sampling step.

According to yet another aspect of the invention, a method of controlling an actuator includes waiting for a selected time interval and reiterating the sampling and processing steps.

According to another aspect of the invention, the back-electromagnetic field (BEMF) of the actuator is calculated rather than measured, using the sampled actuator voltage and sampled actuator current. Additional steps include calculating a velocity error using the BEMF and a selected target voltage, producing a digital voltage command for compensating the actuator voltage for the velocity error, and applying a voltage at the actuator accordingly.

According to another aspect of the invention, actuator apparatus of the invention is disclosed in which a sampler is provided for sampling actuator motor voltage and outputting a digital actuator motor voltage sample. A timer is also provided for periodically activating the sampler. A digital processing engine is used to perform the bulk of the required processing for receiving a target actuator voltage command and the digital actuator motor voltage sample, and for outputting a digital voltage command for controlling the actuator voltage.

The invention provides technical advantages including but not limited to increased precision and accuracy in actuator movement control functions using digital methods and circuitry. The digital approach of the invention provides a higher degree of flexibility in choosing the exact method of control, e.g. for faster sample rates accommodating higher bandwidth control. These and other features, advantages, and benefits of the present invention will become apparent to one of ordinary skill in the arts upon careful consideration of the detailed description of representative embodiments of the invention in connection with the accompanying drawings and tables.

BRIEF DESCRIPTION OF THE DRAWINGS

The present invention will be more clearly understood from consideration of the following detailed description and drawings in which.

References in the detailed description correspond to like references in the figures unless otherwise noted. Like numerals refer to like parts throughout the various figures. Descriptive and directional terms used in the written description such as first, second, upper, lower, left, right, etc., refer to the drawings themselves as laid out on the paper and not to physical limitations of the invention unless specifically noted. The drawings are not to scale, and some features of embodiments shown and discussed are simplified or exaggerated for illustrating the principles, features, and advantages of the invention.

DETAILED DESCRIPTION OF PREFERRED EMBODIMENTS

In general, the invention samples the actuator voltage to dynamically determine the actuator velocity. The compensation needed in order to adjust the voltage across the actuator for improved actuator control is output, and the correct voltage is applied.

Figure 1:
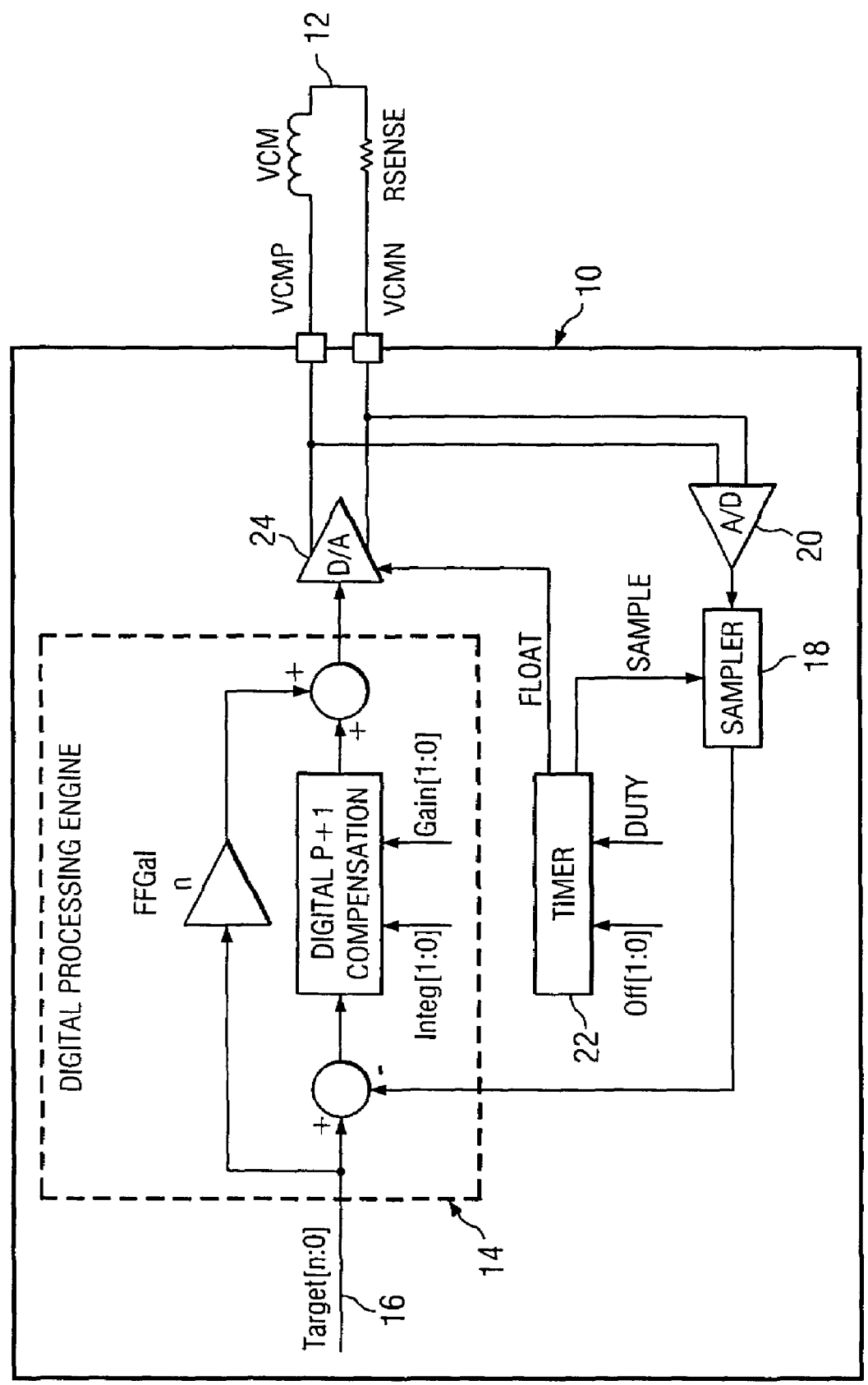
FIG. 1 is a block diagram illustrating an exemplary embodiment of a circuit and method of the invention.

First referring primarily to FIG. 1, a schematic block diagram illustrates an example of a preferred embodiment of apparatus implementing the invention. In the circuit 10 shown, the actuator voltage Vmtr is sensed at the actuator motor 12. A digital processing engine 14 is electrically connected to process the actuator voltage Vmtr and a desired target actuator voltage Vtgt 16 as further described. The sensed actuator voltage Vmtr is typically sampled using a sampler 18, in this case shown connected to an analog-to-digital converter 20. The A/D converter 20 facilitates digital sampling of the analog actuator voltage Vmtr in order to permit the digital processing engine 14 to be used to provide more rapid and accurate processing than would be possible with an analog device. A timer 22 is typically used to control the sampling and output functions, the latter preferably employing a digital-to-analog converter 24 in order to provide an analog output.

Figure 2:
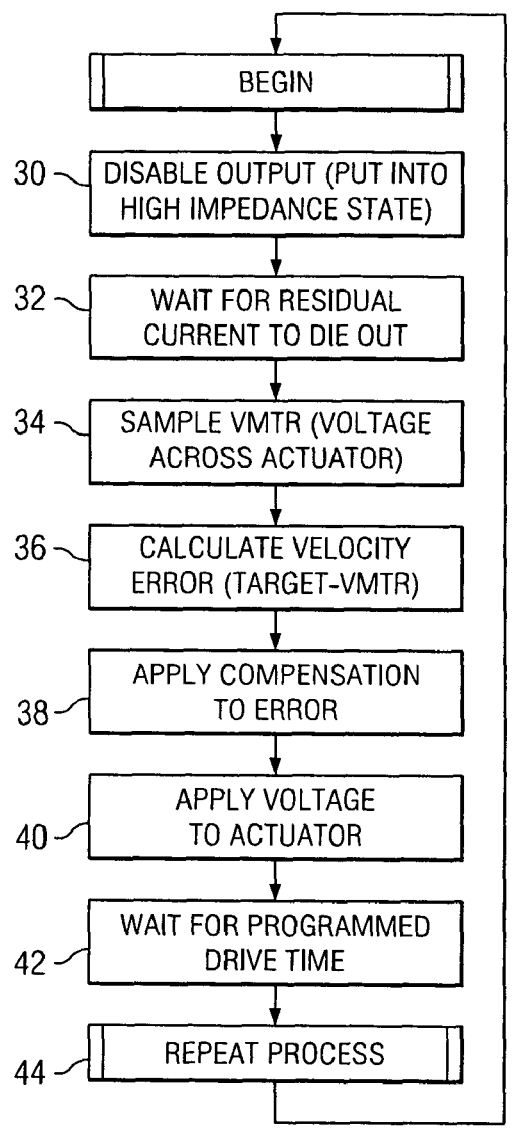
FIG. 2 is a process flow diagram showing an example of a preferred embodiment of a method of the invention.

The operation of the apparatus shown and described will be better understood with reference to the process flow diagram of FIG. 2 illustrating an example of a preferred method of the invention. FIG. 2 is also accompanied by Table 1, showing an alternative representation of steps of the exemplary method of the invention. Indicated in step 30, in preparation for sampling, the output voltage of the actuator Vmtr is disabled, placing the actuator motor in a high impedance state. A pause ensues in order to allow the residual current in the circuit to diminish to approximately zero, shown by step 32. The time duration of the pause is preferably pre-selected based on known electrical characteristics of the actuator. As shown in step 34, the voltage across the actuator Vmtr is sampled. This sampling provides an actual measurement of the electromagnetic field at the motor, also referred to as the back electromagnetic field, or BEMF. Now referring to step 36, the velocity error Ev is now calculated, preferably by subtracting the measured actuator voltage Vmtr form the target voltage Vtgt.

$$Ev=Vtgt-Vmtr \qquad \text{[Equation 1]}.$$

The voltage required to compensate for the velocity error Ev is then calculated, step 38. At step 40, an actuator voltage may now be applied to the actuator, providing compensation for any velocity error. The feedback loop of the circuit facilitates ongoing adjustments to the actuator voltage. At step 42, a pre-selected time interval is preferably allowed to elapse before the foregoing steps are repeated as indicated by the arrow path shown with step 44.

The method steps depicted in FIG. 2 are related in Table 1 in a high-level computer format. The sample code of Table 1 is representative of a preferred embodiment of the invention and it should be appreciated by those skilled in the arts that various alternative computer code and computer platforms may be used within the scope of the invention.

TABLE 1

| | |
|---|---|
| set(hiz_1) | #1 - disable the output - put into high impedance state |
| wait(255) | #2 - wait for residual current to die out |
| wait(145) | |
| set(sel_1) | #3 - selects vmtr through adcmux |
| set(cnv_1,sel_1) | #initiate adc conversion of vmtr |
| hold | #wait for adc conversion to be complete |
| set(cnv_0) | |
| sto(vmtr) | #store the results of the adc conversion into memory |
| lac(target) | #4 - calculate velocity error = target − vmtr |
| sub(vmtr) | |
| sac(error) | #store results of error calculation |
| add(errorold) | #5 - apply compensation to the error |
| mpy(ki) | #compensation is vcmd=ki*[x(n)+x(n−1)] + yi(n−1) #+kp*x(n) + ffwd |
| add(intold) | |
| sac(intold) | |
| lac(error) | |
| sac(errorold) | |
| mpy(kp) | |
| add(intold) | |
| add(ffwd) | #this is compensated error or the new vcmd |
| outac | #6 - apply voltage to the actuator |
| set(hiz_0) | |
| wait(255) | #7 - leave drive voltage applied for a fixed amount of time |
| wait(255) | |
| wait(90) | |
| b(1) | #8 - repeat the process |

Figure 3:
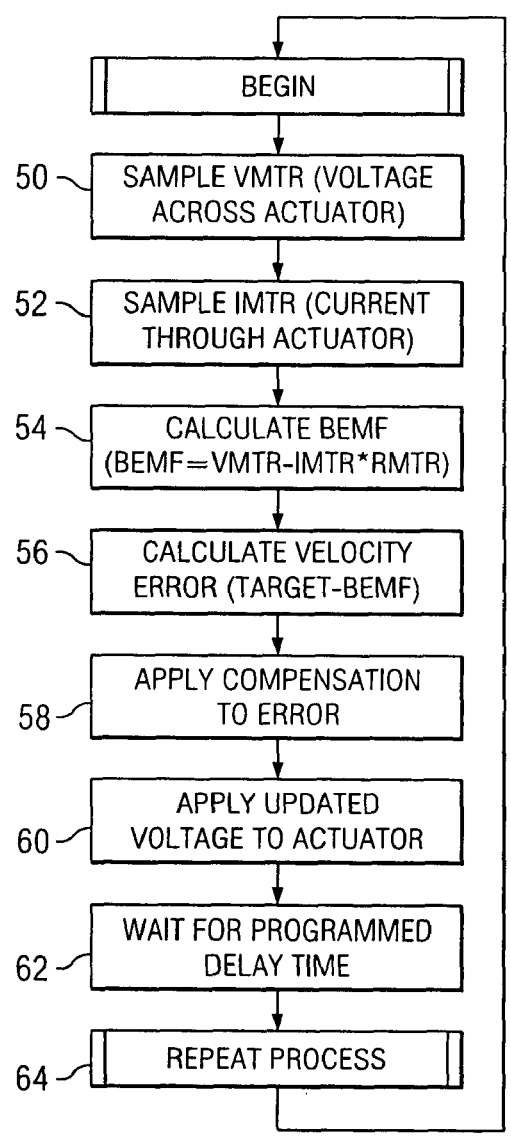
FIG. 3 is a process flow diagram illustrating an alternative embodiment of a method of the invention.

An alternative preferred embodiment of a method of actuator control according to the invention is described with reference to the process flow diagram of FIG. 3. FIG. 3 is also accompanied by the example of Table 2. In this alternative embodiment, the steps resulting in the measurement of the actual motor voltage Vmtr are replaced with steps for calculating the BEMF without interrupting the actuator voltage. The voltage across the actuator motor Vmtr is sampled as shown at step 50. The current through the actuator motor Imtr is also sampled, indicated at step 52. In step 54, the BEMF is calculated using the voltage and current samples according to, $$BEMF=Vmtr-Imtr*Rmtr \quad \text{[Equation 2]},$$

where Rmtr represents the resistance of the actuator motor. In order to compensate for variations in motor resistance, Rmtr is preferably calculated by initially providing a fixed current to the actuator so that it comes to rest against a crash stop. This ensures that the initial BEMF is zero. The motor resistance Rmtr is calculated by measuring the motor voltage Vmtr, and using Ohm's law, dividing by the motor current Imtr. In step 56, this result is used to calculate the velocity error Ev, by subtracting the BEMF from the target voltage, Vtgt, $$Ev=Vtgt-BEMF \quad \text{[Equation 3]}.$$

Knowledge of the velocity error Ev provides the ability to apply a compensating voltage, preferably as part of a digital voltage command Vcmd, as indicated at step 58, where ffwd is the error compensation voltage, $$Vcmd=ki*[x(n)+x(n-1)]+yi(n-1)+kp*x(n)+ffwd \quad \text{[Equation 4]}.$$

The updated voltage is then applied according to the digital voltage command at the actuator, step 60. The foregoing steps may be used to correct for velocity error in an actuator apparatus. Preferably, after delaying for a pre-selected time interval, step 60, the steps may be reiterated, as indicated by the arrow path from step 62. This technique provides dynamic actuator control with precise compensation for velocity error.

The steps of the invention shown and described with reference to FIG. 3 may be further understood by referring to the alternative representation of the invention shown in Table 2. The table is intended to be illustrative of high-level computer instructions for the implementation of an exemplary embodiment of the invention. It will be apparent to those skilled in the arts that various alternative computer code and computer platforms may be used without departure from the scope of the invention.

TABLE 2

| | |
|---|---|
| set(sel_1) | #1 - selects vmtr through adcmux |
| set(cnv_1,sel_1) | #initiate adc conversion of vmtr |
| hold | #wait for adc conversion to be complete |
| set(cnv_0) | |
| sto(vmtr) | #store the results of the adc conversion into memory |
| set(sel_0) | #2 - selects imtr through adcmux |
| set(cnv_1,sel_0) | #initiate adc conversion of vmtr |
| hold | #wait for adc conversion to be complete |
| set(cnv_0) | |
| sto(imtr) | #store the results of the adc conversion into memory |
| lac(imtr) | #3 - calculate bemf voltage = vmtr − imtr*rmtr |
| mpy(mtr) | |
| sac(imtr) | |
| lac(vmtr) | |
| sub(imtr) | |
| sac(bemf) | |
| lac(target) | #4 - calculate velocity error = target − bemf |
| sub(bemf) | |
| sac(error) | #store results of error calculation |
| add(errorold) | #5 - apply compensation to the error |
| mpy(ki) | #compensation is vcmd= ki*[x(n)+x(n−1)]+yi(n−1)+kp*x(n)+ffwd |
| add(intold) | |
| sac(intold) | |
| lac(error) | |
| sac(errorold) | |
| mpy(kp) | |
| add(intold) | |
| add(ffwd) | #this is compensated error or the new vcmd |

TABLE 2-continued

| | |
|---|---|
| outac | #6 - apply voltage to the actuator |
| wait(100) | #7 - leave drive voltage applied for a fixed amount of time |
| b(1) | #8 - repeat the process |

Figure 4:
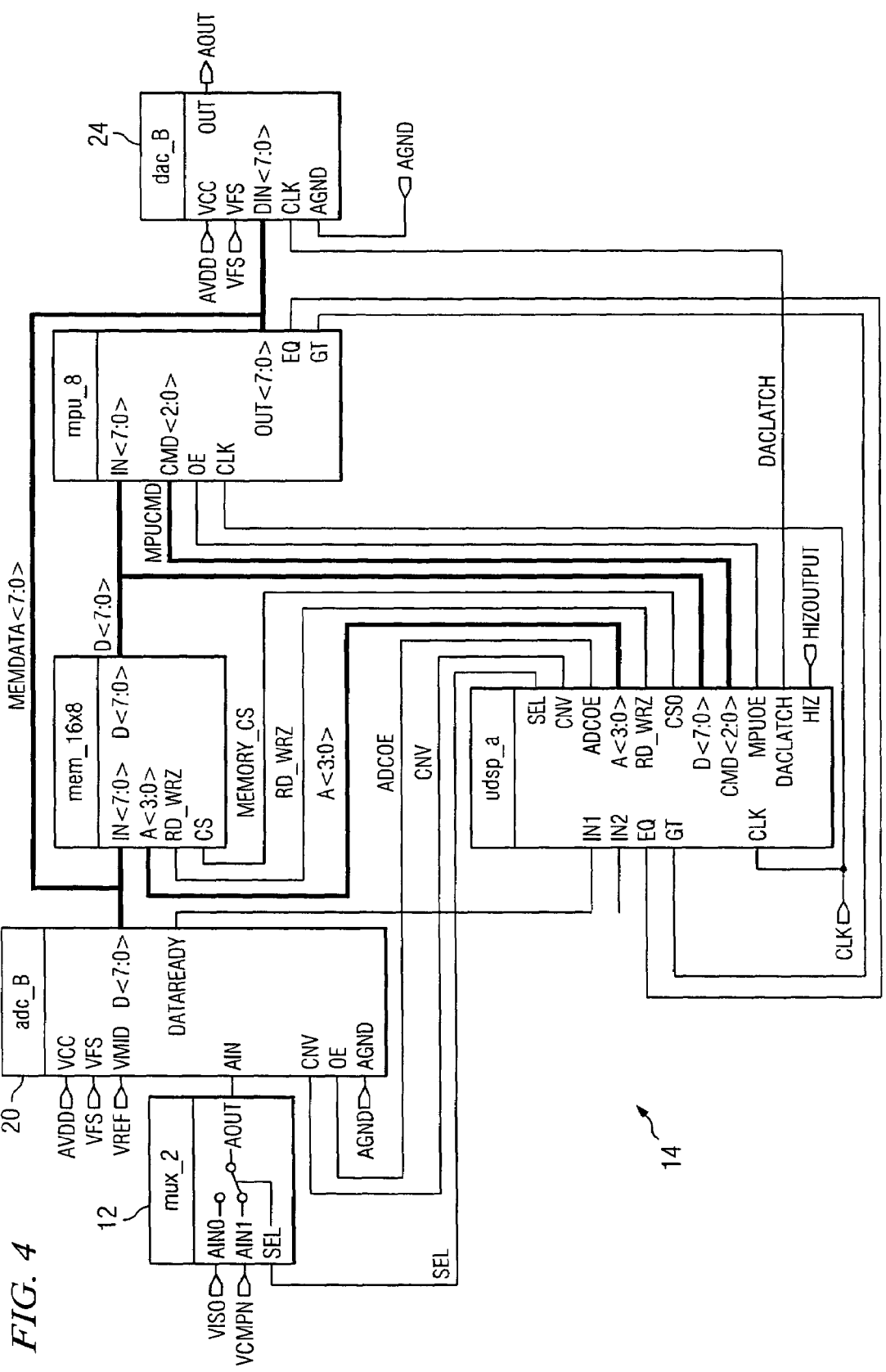
FIG. 4 is a schematic block diagram showing an alternative representative embodiment of a circuit according to the invention.

An additional schematic view of a preferred embodiment of the invention is provided in FIG. 4. An example of details of the digital processing engine 14 and associated circuitry 10 is shown. As directed by encoded instructions, for example Table 1 and Table 2, the circuit 10 samples the voltage across the motor, calculates the error, and determines the appropriate voltage command. Table 3 shows an alternative representation of how each of the commands of Tables 1 and 2 may be executed as shown in FIG. 4. Mux_2 provides the ability to sample the voltage across the coil VCMP (12) or the current through the coil VISO to be sampled at the A/D converter adc_8 (20). Memory device mem_16x8 provides storage space for the variables used to calculate the compensated voltage command for transmission to a D/A converter dac_8. A math processing unit mpu_8 is used for performing mathematical functions and comparisons. The processing engine proper (also represented by numeral 14 in FIG. 1) is indicated by udsp_a. It processes the commands indicated by Tables 1 and 2 and sets the appropriate control lines so that the appropriate execution may be achieved.

TABLE 3

Instruction Set

| OPC | Instruction | Operand |
|---|---|---|
| 0 | null | 8 bit null |
| 1 | lac | 4 bit address 4 bit null |
| 2 | laci | 8 bit data |
| 3 | sac | 4 bit address 4 bit null |
| 4 | sto | 4 bit address 4 bit null |
| 5 | set | 8 bit mask |
| 6 | wait | 8 bit data |
| 7 | hold | 8 bit null |
| 8 | cmp | 4 bit address 4 bit null |
| 9 | bgt | 8 bit data (address?) |
| 10 | b | 8 bit data (address?) |
| 11 | add | 4 bit address 4 bit null |
| 12 | sub | 4 bit address 4 bit null |
| 13 | mpy | 4 bit address 4 bit null |
| 14 | div | 4 bit address 4 bit null |
| 15 | null | 8 bit null |

Instruction Execution:
0 null 0000xxxxxxxx (1 cycle)
1. increment program counter
1 lac 0001xxxxaaaa (1 cycle)
1. set address lines A<3:0> to aaaa
2. set memory CS=1
3. set RD_WRZ=1
4. set mpu CMD=110
5. increment program counter
2 laci 0010dddddddd (1 cycle)
1. set data lines D<7:0> to ddddddd
2. set mpu CMD=110
3. increment program counter
3 sac 0011xxxxaaaa (2 cycles)
first cycle
1. set address lines A<3:0> to aaaa
2. set mpuoe=1

3. set memory CS=1
4. set RD_WRZ=0
5. set mpu CMD=111
second cycle
1. set address lines A<3:0> to aaaa
2. set mpuoe=1
3. set memory CS=0
4. set RD_WRZ=0
5. set mpu CMD=111
6. increment program counter
4 sto 0010xxxxaaaa (2 cycles)
first cycle
1. set address lines A<3:0> to aaaa
2. set memory CS=1
3. set adcoe=1
4. set RD_WRZ=0
second cycle
1. set address lines A<3:0> to aaaa
2. set memory CS=0
3. set adcoe=1
4. set RD_WRZ=0
5. increment program counter
5 set 0101 mmmmmmmm (1 cycle)
1. set discrete outputs=mmmmmmmm
2. increment program counter
6 wait 0110dddddddd (n+1 cycles)
first cycle
1. set data lines D<7:0> to dddddddd
2. set mpu CMD=110
second through n cycles (repeat until eq is set)
1. set data lines D<7:0> to 00000001
2. set mpu CMD=001
n+1 cycle
1. increment program counter
7 hold 0111xxxxxxxx (? cycles)
first through ? cycles (repeat until in1 is set)
1. idle
last cycle
1. increment program counter
8 cmp 1000xxxxaaaa (1 cycle)
1. set address lines A<3:0> to aaaa
2. set memory CS=1
3. set RD_WRZ=1
4. set mpu CMD=100
5. increment program counter
9 bgt 1001dddddddd (1 cycle)
if gt=1
1. set program counter equal to dddddddd
else
1. increment program counter
10 b 1010dddddddd (1 cycle)
1. set program counter equal to dddddddd
11 add 1011xxxxaaaa (1 cycle)
1. set address lines A<3:0> to aaaa
2. set memory CS=1
3. set RD_WRZ=1
4. set mpu CMD=000
5. increment program counter
12 sub 1100xxxxaaaa (1 cycle)
1. set address lines A<3:0> to aaaa
2. set memory CS=1
3. set RD_WRZ=1
4. set mpu CMD=001
5. increment program counter
13 mpy 1101xxxxaaaa (n cycles?)
1. set address lines A<3:0> to aaaa
2. set memory CS=1
3. set RD_WRZ=1
4. set mpu CMD=010
5. increment program counter
14 div 1110xxxxaaaa (n cycles?)
1. set address lines A<3:0> to aaaa
2. set memory CS=1
3. set RD_WRZ=1
4. set mpu CMD=011
5. increment program counter
15 outac 1111xxxxxxxx (2 cycles)
first cycle
1. set mpuoe=1
2. set daclatch=1
second cycle
1. set daclatch=0
2. set mpuoe=0

A brief description of addition, from step 11, Table 3, is provided to show a representative example of the execution of a simple instruction. The instruction set is begun with:

11 add 1011xxxxaaaa (1 cycle).

| | |
|---|---|
| 1. set address lines A<3:0> to aaaa | Sets the addresses for mem__16x8 |
| 2. set memory CS=1 | The memory block mem__16x8 is selected so that it may act as either an input or output deice as further directed by RD_WRZ |
| 3. set RD_WRZ=1. | The memory mem__16x8 is configured so that the data stored at address "aaaa" is available at the D<7:0> bus |
| 4. set mpu CMD=000. | The mpu_8 is caused to add the value at D<7:0> to the value currently stored in its internal accumulator: |
| 5. increment program counter. | The program counter is then incremented so that the next instruction may be executed. The result of the present instruction is allowed to remain in the accumulator of mpu_8: |

An example of MPU commands useful in understanding the preferred embodiment of the invention shown and described appears in Table 4. It should be understood that the examples shown and described are preferred embodiments and are intended to convey the concept of the invention and are not the sole possible embodiment of the invention.

TABLE 4

MPU COMMANDS

| CMD | Operation | Action |
|---|---|---|
| 000 | add | acc=acc+in |
| 001 | subtract | acc=acc−in |
| 010 | multiply | acc=acc*in |
| 011 | divide | acc=acc/in |
| 101 | tbd | |
| 102 | lac | acc=in |
| 103 | sac | acc is available at mpu output. |

Thus, the invention provides methods, systems, and circuits for improved HDA actuator control responsive to digitally monitored actuator motor velocity. While the invention has been described with reference to certain illustrative embodiments, the description of the methods and devices described are not intended to be construed in a limiting sense. For example, many alternative digital processing engines may be used without departure from the invention. Various modifications and combinations of the illustrative embodiments as well as other advantages and embodiments of the invention will be apparent to persons skilled in the art upon reference to the description and claims.

We claim:

1. In a hard drive assembly having an actuator, the actuator having an actuator voltage, a method of controlling the actuator comprising the steps of:

sampling the actuator voltage;

sampling an actuator current;

calculating a BEMF using the sampled actuator voltage and sampled actuator current;

calculating a velocity error using the BEMF and a selected target voltage;

producing a digital voltage command for compensating the actuator voltage for the velocity error; and applying a voltage at the actuator according to the digital voltage command, wherein the digital voltage command, Vcmd, may be described by the formula, $$Vcmd = ki*[x(n)+x(n-1)]+yi(n-1)+kp*x(n)+ffwd \quad \text{[Equation 4]},$$

wherein, ki is a constant representing the magnitude of integral compensation to apply, x(n) is a sample of the current value of the error term Ev, yi represents the output of the integral portion of the compensation, and ffwd represents a feed forward voltage that allows the loop to run with a zero error within the dynamic range of the integrator.

2. A method according to claim 1 wherein the step of calculating a BEMF may be described by the formula, $$BEMF = Vmtr - Imtr*Rmtr \quad \text{[Equation 2], wherein}$$

Vmtr represents actuator motor voltage,

Imtr represents actuator current, and

Rmtr represents actuator motor resistance.

3. A method according to claim 1 wherein the step of calculating a velocity error, Ev, may be described by the formula, $$Ev = Vtgt - BEMF \quad \text{[Equation 3], wherein}$$

Vtgt represents target actuator voltage, and

BEMF represents the actual voltage across the actuator.

4. In a hard drive assembly having an actuator, the actuator having an actuator voltage, a method of controlling the actuator according to claim 1 further comprising the steps of, subsequent to the applying step, waiting for a selected time interval and reiterating the foregoing steps.

5. A velocity-controlled actuator apparatus in a hard drive assembly having an actuator motor, the velocity-controlled actuator apparatus comprising:

a sampler for sampling an actuator motor voltage and outputting a digital actuator motor voltage sample;

a timer for periodically activating the sampler; and a digital processing engine for receiving a target actuator voltage command and the digital actuator motor voltage sample and for outputting a digital voltage command for controlling the actuator motor.

6. A velocity-controlled actuator apparatus according to claim 5 wherein the timer is further adapted for putting the actuator motor in a high impedance state.

7. A velocity-controlled actuator apparatus according to claim 5 further comprising a digital-to-analog converter for receiving the digital processing engine digital voltage command and outputting an analog voltage.

8. A velocity-controlled actuator apparatus according to claim 5 further comprising an analog-to-digital converter operatively coupled to the actuator motor and sampler for sampling an analog actuator voltage and providing a digital signal to the sampler.

9. A velocity-controlled actuator apparatus according to claim 5 wherein the digital processing engine further comprises a gain component for providing a pre-selected output gain.

10. A velocity-controlled actuator apparatus according to claim 5 wherein the digital processing engine further comprises an integrator for calculating the digital voltage command.

11. A velocity-controlled actuator apparatus according to claim 5 wherein the digital processing engine further comprises a digital processing engine shared by other functions in the hard drive assembly.

12. A velocity-controlled actuator apparatus according to claim 5 wherein the digital processing engine further comprises machine readable instructions according to Table 1.

13. A velocity-controlled actuator apparatus according to claim 5 wherein the digital processing engine further comprises machine readable instructions according to Table 2.

14. A velocity-controlled actuator apparatus according to claim 5 wherein the digital processing engine further comprises machine readable instructions according to Table 3.

* * * * *